B. A. KAMP.
Corn-Sheller.
No. 228,078.    Patented May 25, 1880.
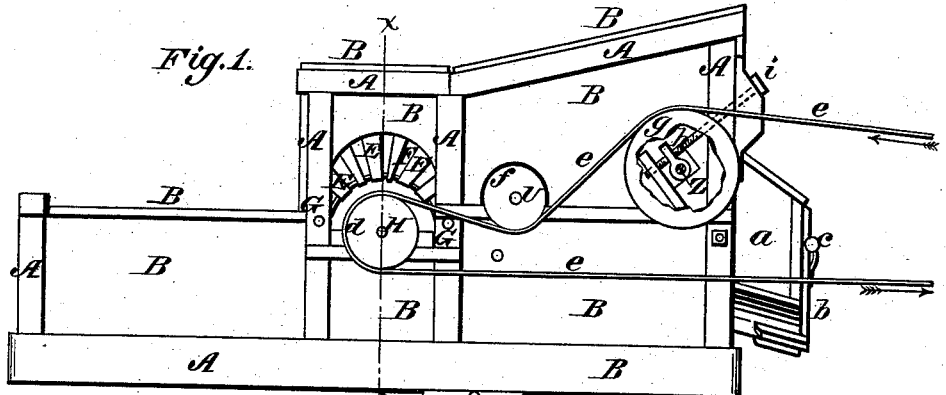
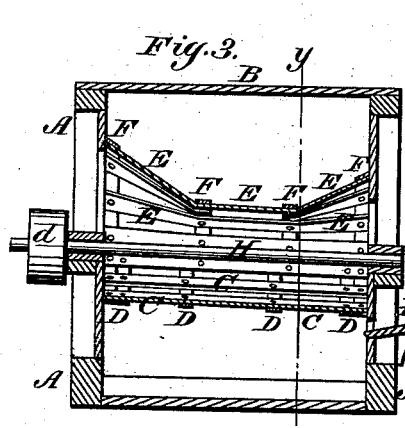
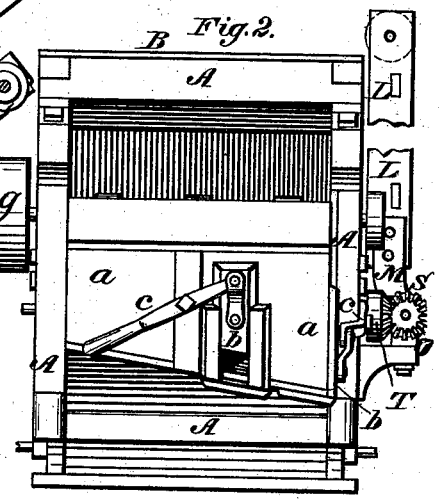
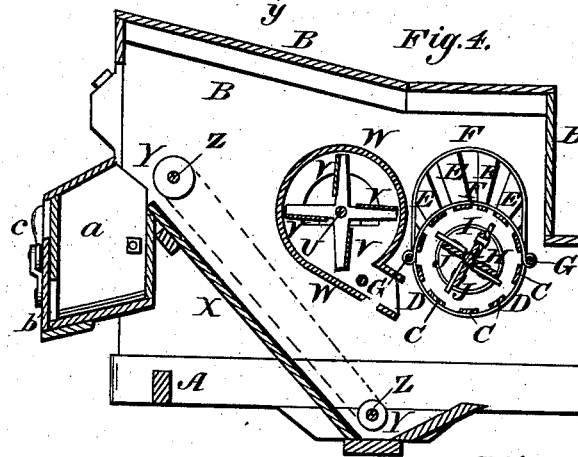
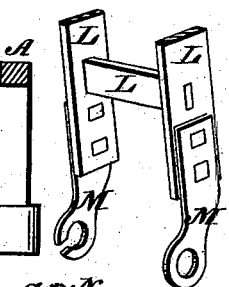
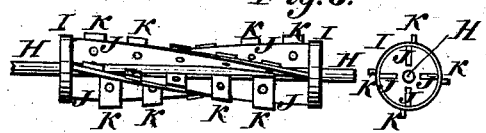
WITNESSES:
Donn P. Twitchell
C. Sedgwick
INVENTOR:
B. A. Kamp
BY Munn & Co.
ATTORNEYS.
N. PETERS, PHOTO-LITHOGRAPHER, WASHINGTON, D. C.

UNITED STATES PATENT OFFICE.

BERTHOLD A. KAMP, OF EVANSVILLE, INDIANA.

CORN-SHELLER.

SPECIFICATION forming part of Letters Patent No. 228,078, dated May 25, 1880.

Application filed December 18, 1879.

*To all whom it may concern:*

Be it known that I, BERTHOLD A. KAMP, of Evansville, in the county of Vanderburg and State of Indiana, have invented a new and useful Improvement in Corn-Shellers, of which the following is a specification.

Figure 1 is a side elevation of the improvement. Fig. 2 is an end elevation. Fig. 3 is a sectional elevation taken though the line $xx$, Fig. 1. Fig. 4 is a sectional side elevation taken through the line $y y$, Fig. 3. Fig. 5 is a perspective view of the lower part of the cob-carrier. Fig. 6 is a side and end elevation of the shelling-cylinder.

The object of this invention is to furnish corn-shellers so constructed that they will not become clogged, will not break the cobs, will carry the cobs out of the way, and will deliver the shelled corn into a spout, whence it can be drawn off into sacks or other receivers.

Similar letters of reference indicate corresponding parts.

A represents the frame of the machine, which is inclosed upon the sides and top with a casing, B. In the upper middle part of the frame A is secured the concave, which is made in two parts or halves. The lower part or half is formed by attaching straight longitudinal bars C to curved or semicircular cross-bars D. The upper part or half is formed by attaching longitudinal bars E to curved or semicircular cross-bars F. In the upper part of the concave the end parts of the bars E are bent outward to give a flaring shape to the ends of the said part, to facilitate the entrance of the ears of corn and the egress of the cobs.

The passage of the ears through the concave is further facilitated by giving a slight downward inclination to the said concave, as shown in Fig. 3.

The ends of the curved cross-bars D F have eyes formed upon them to receive the rods or long bolts G, which connect the two parts of the concave and secure the concave to the frame A.

H is a shaft which passes longitudinally through the concave C D E F, and revolves in bearings attached to the frame A. To the shaft H are attached two or more collars, I, which are slotted or notched radially to receive the ends of the longitudinal bars J, and have bands passed around them to keep the said ends of the bars J in place. The bars J are bent or twisted, so as to have a quarter-turn between the collars I. To the bars J, at suitable distances apart, are attached small plates K, to serve as teeth.

With this construction, as the ears of corn are fed into the concave they are shelled between the concave and cylinder, and are carried forward by the action of the said cylinder, the cobs being discharged at the other end of the concave.

As the cobs escape from the concave they are received upon the carrier L, by which they will be carried away from the machine. The carrier L may be made of any required length to carry the cobs to any desired distance from the machine and deposit them in a pile or stack. The carrier may be made in parts jointed or hinged together, so that it may be folded together for convenience in transportation.

To the lower end of the side bars of the carrier are attached, or upon them are formed, eye-plates M, the eyes of which fit upon hollow gudgeons N, formed upon brackets O, attached to the frame A, or to arms attached to the said frame, so that the outer end of the carrier L may be raised and lowered as the height at which the cobs are to be delivered may require.

The shaft P, to which the lower flanged pulleys Q, that carry the endless apron of the carrier, are attached, passes through the cavities of the hollow gudgeons N, and has a nut screwed upon its end.

One of the eye-plates M is slotted, and one of the gudgeons N is placed upon the inner side of its bracket and the other upon the outer side of its bracket, as shown in Fig. 5. With this construction, by removing the nut of the shaft P the eyes of the eye-plates M may be slipped off the gudgeons N, so that the carrier L may be detached without removing the pulleys O from the shaft P, one of the said eyes passing off the end of the shaft P, and the slot of the other eye allowing the said shaft P to pass through it.

Any shelled corn that may pass out with the cobs is received in a spout, R, and guided back into the lower part or well of the machine.

To the end of the shaft P is attached a beveled-gear wheel, S, the teeth of which mesh into the teeth of a beveled-gear wheel, T, attached to the end of a fan-shaft, U.

The fans V are attached to the shaft U, and work in a case, W, the discharge-spout of which is so arranged as to discharge the air-blast against the corn as it falls from the concave. In a practical machine it is designed to have the corn fall upon a revolving screen, where it is exposed to the air-blast, and from which it falls upon an inclined apron and is carried down into the lower part or well of the machine.

The shelled and cleaned corn is carried up an inclined plane or apron, X, by an endless carrier passing around pulleys Y, attached to the shafts Z, which revolve in bearings attached to the frame A.

At the upper end of the inclined apron X the corn falls into a spout or box, $a$, attached to the rear end of the frame A, and which is provided with one or more discharge-openings. The drawings show the spout $a$ as provided with two discharge-openings, one in its end and the other in its outer side. The discharge-openings of the spout $a$ are closed by slides or gates $b$, which slide in grooves in cleats attached to the spout $a$.

The slides $b$ are operated by levers $c$, pivoted to them and to the spout $a$, so that the corn may be drawn off when and as required.

To the journal of the cylinder-shaft H is attached a pulley, $d$, around which the driving-belt $e$ passes.

The driving-belt $e$ passes around the lower part of the pulley $f$, attached to the journal of the fan-shaft U, and around the upper part of the pulley $g$, attached to the journal of the shelled-corn-elevator shaft Z, as shown in Fig. 1, so that all the parts of the machine may be driven by a single belt, $e$. This construction effects a great saving in belts and in the time required to take care of and repair the said belts.

The bearings $h$ for the upper shaft, Z, of the shelled-corn elevator have screw-holes formed through them to receive the screws $i$, which are swiveled to the frame A, so that the endless apron of the said elevator may be tightened as may be required.

Having thus fully described my invention, I claim as new and desire to secure by Letters Patent—

1. The corn-sheller concave constructed in two parts, connected together and to the frame by means of the long bolts G, and eyes formed on the cross-bars D F of said concave sections, as shown and described.

2. In a corn-sheller, the concave constructed as herein shown and described, consisting of the lower part, formed of the longitudinal bars C and the curved cross-bars D, and the upper part, formed of the longitudinal bars E, having their ends bent or flared outward, and the curved cross-bars F, as set forth, so that the ears of corn will enter and the cobs will leave the said concave freely, as set forth.

3. In a corn-sheller, a shaft, H, having notched collars I, in which are radially-fixed spirally-set quarter-twisted longitudinal blades or bars J, having plate-teeth K, as and for the purpose set forth.

4. In a corn-sheller, the combination, with the cob-carrier L, of the plates M, having eyes, the hollow brackets O, having gudgeons N, and the shaft P, having end nut, one of said plates being slotted, and one of the gudgeons being placed on the inner side and the other on the outer side of the brackets, as and for the purpose specified.

BERTHOLD A. KAMP.

Witnesses:
ALEXANDER GILCHRIST,
RANE CLAY WILKINSON.